United States Patent [19]
Boykin, II et al.

[11] 4,304,194
[45] Dec. 8, 1981

[54] AUTOMATIC POULTRY GROWTH STIMULATOR SYSTEM

[75] Inventors: Herman N. Boykin, II; Covie R. Moore, both of Batesville, Ark.

[73] Assignees: Larry Altom; Paul Henry; Virginia Henry, all of Batesville, Ark. ; part interest to each

[21] Appl. No.: 134,632

[22] Filed: Mar. 27, 1980

[51] Int. Cl.³ ............................................ A01K 39/00
[52] U.S. Cl. ................................................. 119/51 R
[58] Field of Search ........................ 119/51 R, 20, 53; 62/236

[56] References Cited

U.S. PATENT DOCUMENTS

| | | | |
|---|---|---|---|
| 2,794,576 | 6/1957 | Reynolds | 119/53 X |
| 3,315,474 | 4/1967 | Farer | 62/236 X |
| 4,167,153 | 9/1979 | Markum | 119/51 R |

Primary Examiner—Hugh R. Chamblee
Attorney, Agent, or Firm—Stephen D. Carver

[57] ABSTRACT

An automatic system for stimulating the growth of poultry or other commercially raised animals. The system preferably comprises a mannequin for simulating a human being which is periodically moved throughout the animal enclosure or feed area. The mannequin is operatively suspended from a guide track by a control box which includes a self-contained power supply for rotating drive wheels riding the track. A timing system is employed for periodically recharging the power supply battery and for properly timing mannequin travel. Properly timed mannequin movements and periodic mannequin noises promote regular animal feeding to thereby enhance growth.

21 Claims, 7 Drawing Figures

AUTOMATIC POULTRY GROWTH STIMULATOR SYSTEM

BACKGROUND OF THE INVENTION

The present invention relates generally to animal feeding systems. More particularly, the present invention relates to an automated system adapted to be installed within an animal feeding enclosure to stimulate animal feeding and growth by periodically simulating a human figure.

In the prior art a variety of automated systems have been employed for feeding animals. Most known prior art devices dispense feed at predetermined feed locations within an enclosure at periodic intervals. Some prior art systems of the latter type additionally dispense measured amounts of feed. Examples of such technology may be seen in U.S. Pat. Nos. 3,352,286; 3,545,408; 3,485,215; and 3,904,082.

Examples of structure adapted to stimulate animal movement for training or exercising purposes may be seen in U.S. Pat. Nos. 3,312,195 and 3,349,751. U.S. Pat. No. 4,167,153 discloses a method for moving poultry within an enclosure by transporting a baffle from a track structure for urging poultry toward a feeding position.

As will be appreciated by those skilled in the art, the object of large scale poultry raising operations is to produce maximum amounts of matured chickens of appropriate weight within limited times. We have discovered that chickens which are periodically exposed to the apparent movement of a human being within a feeding enclosure tend to eat more, and thus present more advantageous weight "profiles" prior to processing and cleaning. Young chicks will quickly rise and move about an enclosure in response to the sight and sound of a human figure therewithin. Chicks or other animals periodically exposed to an apparent human figure will be encouraged to eat at regular intervals more effectively than they would without the stimulus of a "human figure".

It has been found, for example, that for the most efficient feeding of typical birds, feed must stay in the animal for approximately three and one half hours. Therefore, it seems advantageous to provide a system for stimulating birds which will operate in a timed fashion to periodically stimulate the birds to eat, but which will allow the birds sufficient time to digest previously eaten food for an opimum period of time. Experimental data derived in our tests clearly indicate that the "weight profiles" of birds grown in an enclosure subjected to timed, automated stimulation exceed weight profiles of "unstimulated" birds. Similar evidence mandates appropriate timing for optimum results with a "simulation" system.

SUMMARY OF THE INVENTION

Our invention comprises an automated system for periodically stimulating animals to eat, wherein a dummy or mannequin, substantially resembling a human form, is automatically moved within an animal raising enclosure at properly timed intervals.

In the preferred embodiment a supporting guide track is rigidly secured at an elevated position within the enclosure. A mannequin, or dummy, substantially in the form of a human figure, is suspended from the guide rail via a control box which includes a pair of drive wheels coupled to the guide rail for propelling the apparatus throughout the enclosure. The control box preferably includes a self contained battery supply and an internal motor for moving the mannequin. Preferably, a noise generator is contained within the mannequin for effectuating audio stimulation of the birds.

At periodic intervals the dummy reaches a battery recharge position at which point it activates a timer system which disables the drive motor and initiates battery recharging. Preferably, the apparatus remains "off" for approximately three to four hours, after which time an auxiliary timer will reactivate the control box to recycle the dummy through the feed house. When the birds (or other animals) housed within the enclosure are stimulated in this timed fashion, greater weight profiles will be produced.

Therefore, an important object of this invention is to increase the efficiency and productivity of an animal growing system.

A similar object of this invention is to provide an automated system for use in poultry feed houses for increasing the weight profiles of harvested birds.

Another object of this invention is to provide an automated system for simulating the presence of a human being at properly timed intervals for fattening birds being raised.

A basic object of this invention is to provide an automated system for greatly increasing realized poultry weight profiles.

Yet another object of this invention to to provide a system of the character described which may be readily attached and and secured within existing animal feed houses without major structural adaptations or modifications.

A similar object of this invention is to provide a completely automated self-powered human simulation system for poultry raising houses which will automatically and periodically recharge itself at appropriate timed intervals.

Another object of this invention is to provide a unique drive carriage system for an automated poultry feeding system of the character described.

Still another object of this invention is to provide a system of the character described that is adapted for use with various forms of poultry and other commercially grown animals.

These and other objects and advantages of this invention, along with features of novelty appurtenant thereto, will appear or become apparent in the course of the following description.

BRIEF DESCRIPTION OF THE DRAWINGS

In the appended drawings, which form a part of the specification and which are to be construed in conjunction therewith, and in which like reference numerals have been employed throughout to indicate like parts in the various views.

DETAILED DESCRIPTION OF THE DRAWINGS

Figure 1:
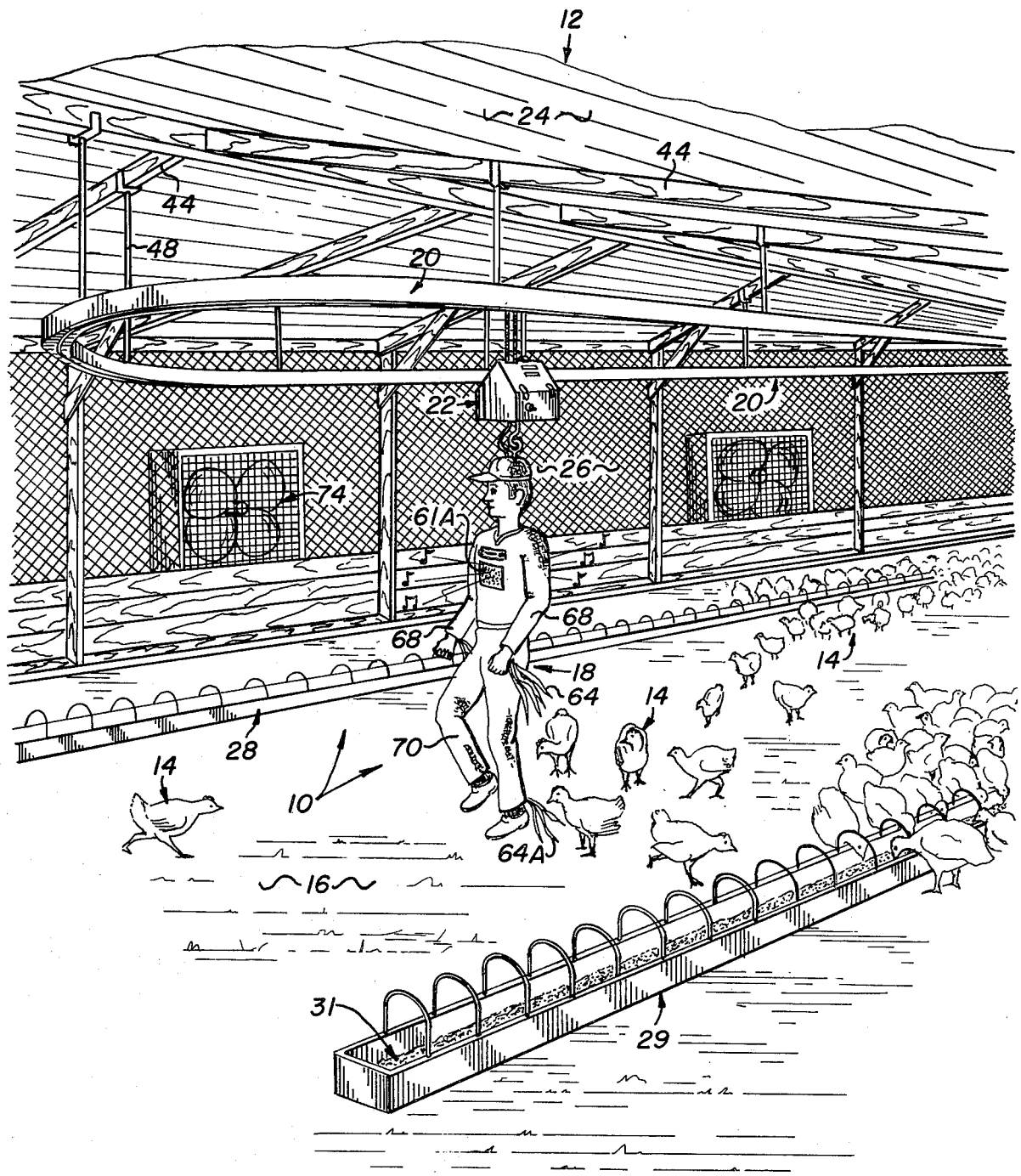
FIG. 1 is an elevational and pictorial view of the interior of a poultry raising house in which an automated system constructed in accordance with the teachings of this invention is shown in operative position.

With reference now to the drawings, a system for periodically stimulating the growth of animals constructed in accordance with the teachings of this invention is generally designated by the reference numeral 10. System 10 is adapted to be secured within an enclosure 12 of the type conventionally employed for growing animals, such as the young chicks 14 disposed about the floor 16 of the enclosure. The system comprises a human-like mannequin or dummy 18 which is suspended from an elongated, rigid guide track 20 via a control box 22 for periodic movement within the enclosure or around animal feed lot 16.

It will be appreciated by those skilled in the poultry art that enclosure 12 is of conventional cubical dimensions, comprising a roof 24 supported by walls 26 rising from the ground on floor 16. The young chickens 14 (or other animals being raised) are generally free to move to any position therewithin. Periodic feeding takes place at conventional, elongated feed troughs 28, 29 which distribute feed 31 automatically via an auger system of conventional construction. The system contemplated by the present invention may be installed within similar feed houses for use with a variety of animals other than chickens The track 20 is of preferably C-shaped cross sectional profile (FIG. 4) and is preferably disposed in the form of a closed loop within the enclosure. As best viewed in FIG. 2 and 4, the track 20 is adapted to receive a carriage assembly 36 which includes drive wheels 38, 39 for propelling the apparatus throughout the enclosure. Track 20 preferably includes a pair of downwardly projecting inturned edge portions 40, 41, the interiors of which frictionally contact drive wheels 38, 39.

As hollow slot 43 is defined between edges 40, 41 so as to facilitate passage of drive chain 45, as will be discussed in detail later.

Figure 2:
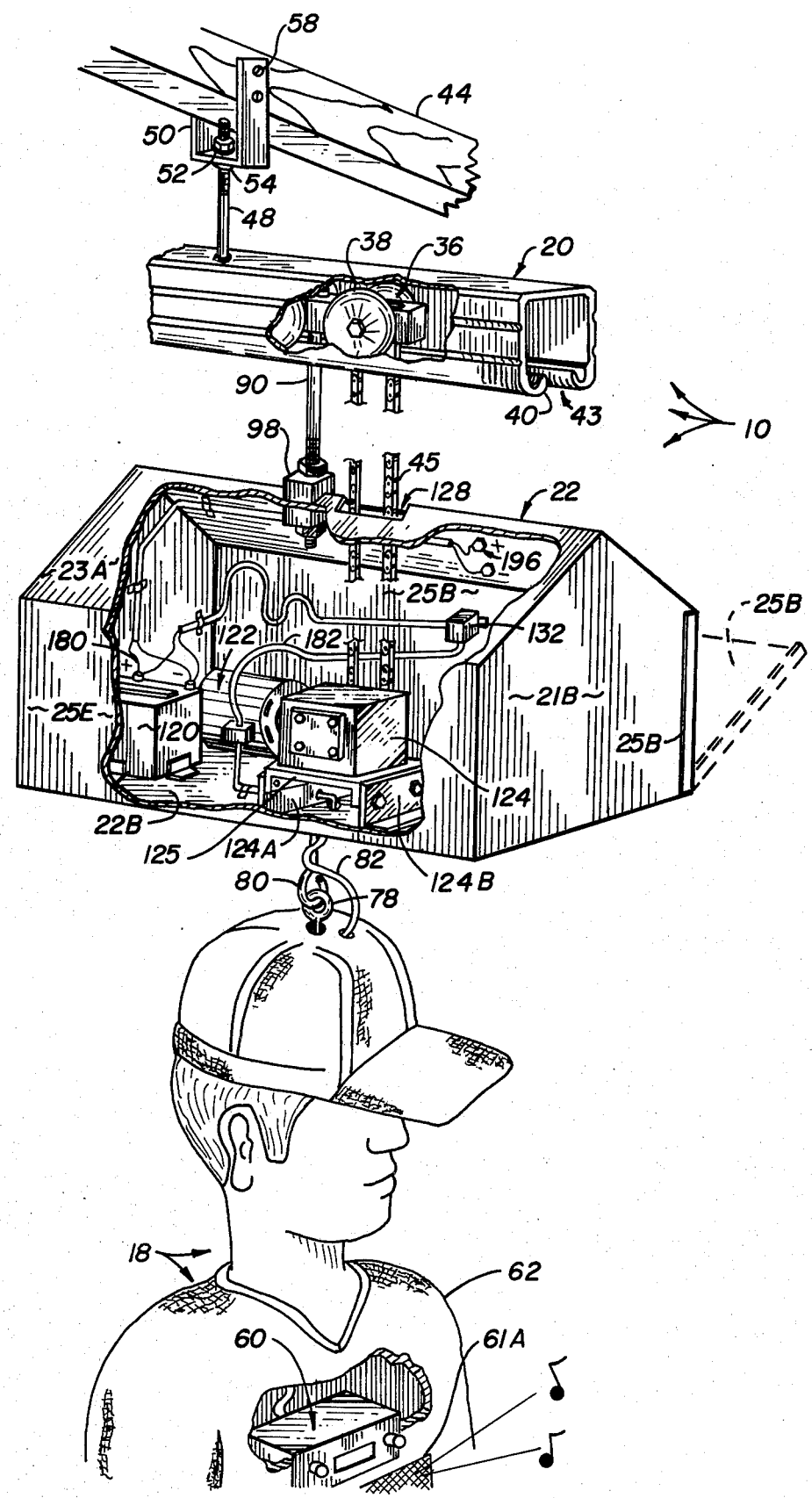
FIG. 2 is an enlarged, pictorial view of the invention with parts thereof broken away or shown in section for clarity.
Figure 4:
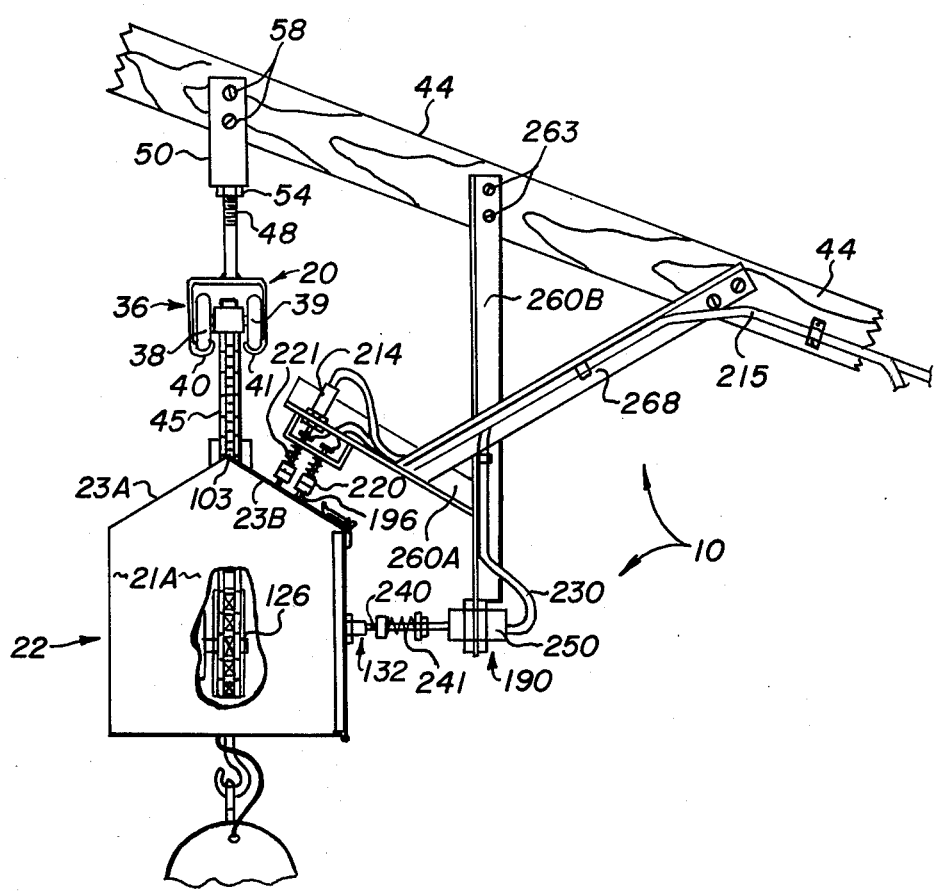
FIG. 4 is a side elevational view of the apparatus, with parts thereof broken away or omitted for brevity, illustrating the apparatus positioned at a recharge station.

Acceptable track is available from Crowder Manufacturing LTD., and Model C-104 is recommended. Track 20 is preferably suspended from interior joists 44 by elongated carriage bolts 48 which extend from the track and are received by clevis's 50, being secured thereto by a pair of conventional bolts 52, 54. As best illustrated in FIGS. 2, 4 the clevis braces 50 are secured to joists 44 with conventional screws 58.

Mannequin 18 comprises a life-like figure adapted to simulate a human being. It should be understood that, as used herein, the term "mannequin" refers to any substantially humanshaped model, dummy, or robot or similar "humanoid" structure. The dummy 18 is of generally rigid construction, and preferably includes a sound projection system 60 of conventional construction disposed within its "torso" to produce sound. It will be noted that streamers 64, 64A may be attached respectively to arms 68 or legs 70 of the dummy 18 to further visually stimulate the chickens 14 in response to air movements within the enclosure. For example, conventional fan structure 74 (FIG. 1) circulates air within the enclosure 12 for ventilation purposes resulting in movement of the streamers 64, 64A and additional visual stimulation of the chickens 14. The rigid head of the mannequin receives eyelet 78 which is coupled to control box 22 via a hook 80. An electrical cable 82 extends from the control box 22 into the dummy 18 whereby to power the sound system 60.

Sound system 60 is preferably an endless loop eight track or cassette tape player of conventional construction. It will be appreciated that a loud speaker or similar transducer 61 (FIG. 7) will be positioned appropriately with respect to grate 61A so as to facilitate widespread broadcast of desired sounds within the enclosure 12. System 60 is powered by battery 120 within control box 22 via lines 82A, 82B forming cable 82.

The control box 22 is of preferably cubical dimensions, comprising a roof apex formed from intersecting inclines 23A, 23B, which extend between end walls 21A, 21B. A moveable access permitting side wall 25B is coupled to the bottom 22B of control box 22 via an elongated, conventionally constructed hinge 27A. Access wall 25B may be opened to permit access interiorly of the control box 22 via conventional couplings 25C, 25E which may be manually opened or closed as desired.

Figure 3:
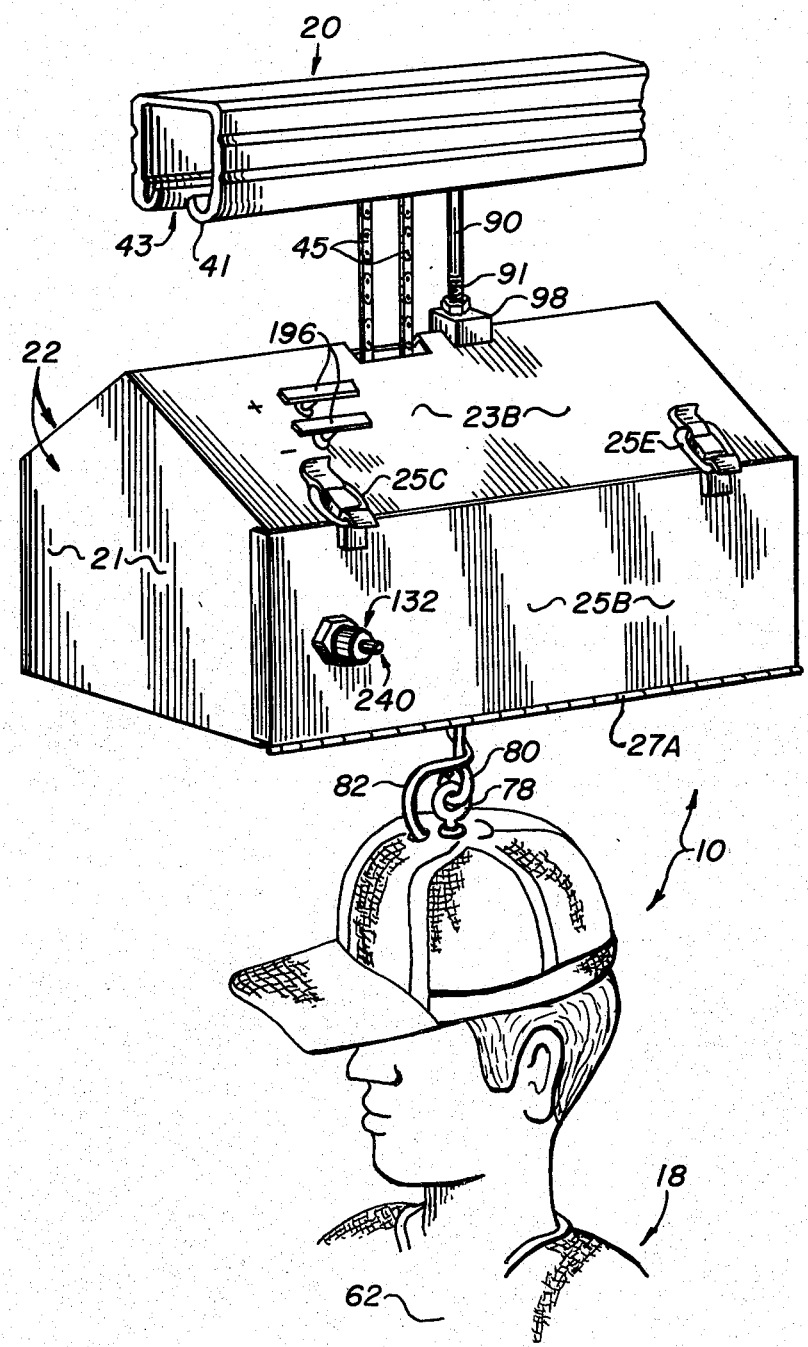
FIG. 3 is a pictorial view similar to FIG. 2 illustrating an opposite side of the control box.
Figure 6:
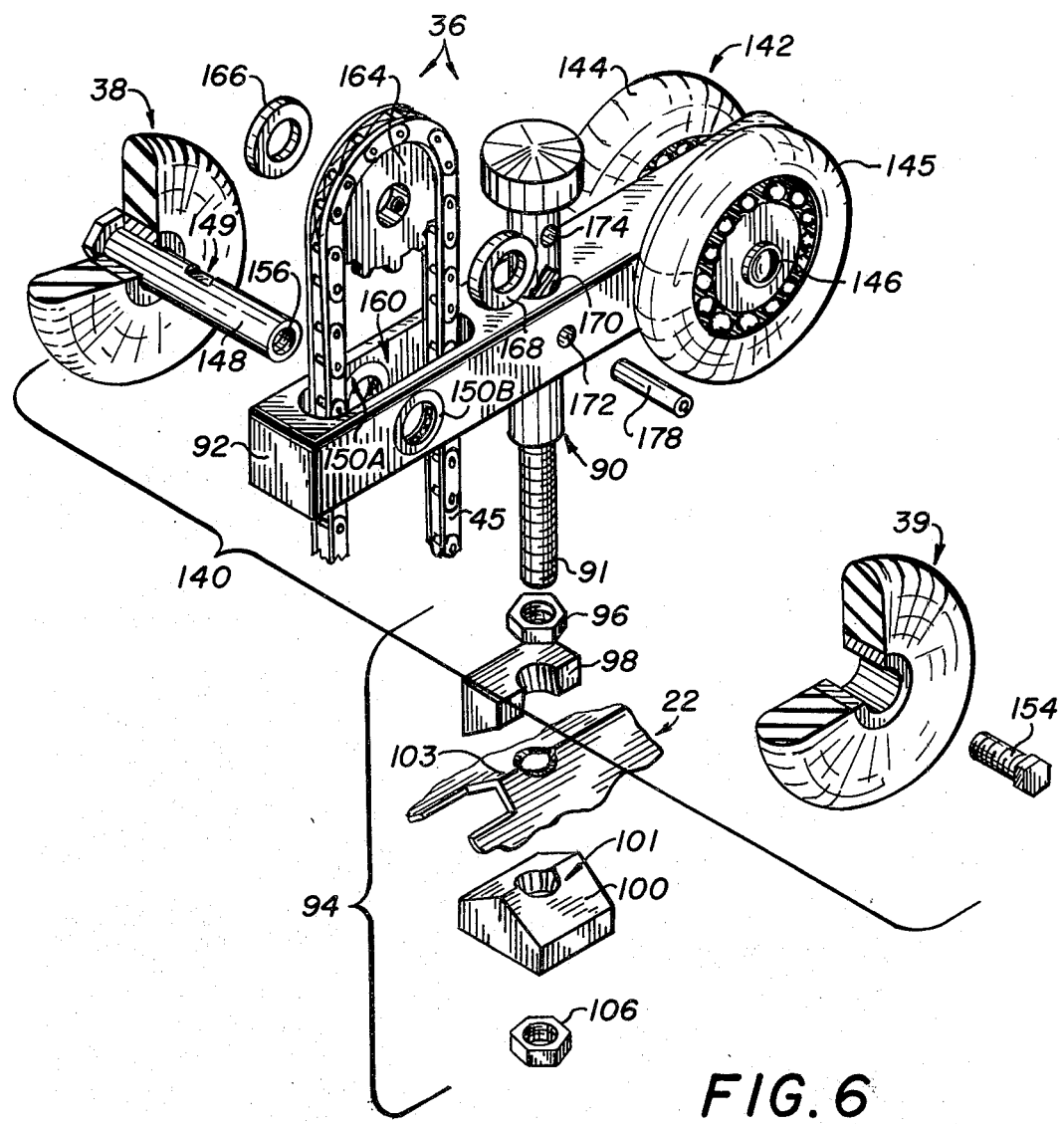
FIG. 6 is an enlarged, exploded isometric view of the drive carriage preferably employed with the present invention; and, FIG. 7 is an electrical schematic diagram of a preferred form of the apparatus.

Control box 22 is suspended from carriage 36 via an elongated, preferably threaded bolt 90 which penetrates orifice 170 in carriage frame 92 (FIG. 6) and terminates in a lower, threaded shank portion 91. Shank portion 91 is secured to the control box 22 via a coupling assembly 94 comprising a first bolt 96, an apertured bushing 98 of triangular-shaped profile, a cooperative bushing 100 having an upper triangular-shaped surface 101 adapted to be matingly secured against roof apex 103, and retainer bolt 106 adapted to firmly secure bushings 98 and 100 together on opposite sides of roof apex 103. It will be appreciated that other means of attachment may be employed to couple box 22 to track 20. As best viewed in FIGS. 2 and 3, it will be appreciated that bolt 90 will be disposed between slot 43 between edges 40, 41.

Control box 22 includes an internal power supply, preferably a conventional battery 120 which drives a conventional motor 122 (FIG. 2). Motor 122 is coupled to a conventional gear reducer 124, which rotates drive gear 126 (FIG. 4) in driving engagement with drive chain 45 which extends upwardly through the roof of the control box through an orifice 128 and, as will later be discussed in detail, is drivingly coupled to carriage assembly 36. Reducer 124 is conventionally secured to a mounting plate 125 which is in turn mounted between a pair of spaced-apart, angle brace members 124A, 124B secured to control box floor 22B. As will be described in more detail hereinafter, motor 122 is controlled by a microswitch assembly 132 mechanically secured to control box access door 25B. When appropriately actuated, micro-switch 132 will interconnect battery 120 with motor 122 to thereby propel the dummy 18 throughout the enclosure.

The carraige assembly 36 (FIG. 6) is adapted to propel the mannequin or dummy 18 (and the control box 22) throughout the enclosure 12. Carriage 36 preferably comprises an elongated, generally rectangular, rigid frame 92 to which a drive wheel assembly 140 and a spaced-apart follower wheel assembly 142 are rotatably coupled. Follower wheel assembly 142 comprises a pair of preferably plastic wheels 144 and 145 which are coupled to opposite ends of an axle 146 journaled for rotation with respect to frame 92. The drive wheel assembly 140 comprises individual drive wheels 38, 39 which are secured together on opposite ends of drive axle 148 on opposite sides of frame 92. Relative rotation is insured by bearings 150A, 150B press fitted into frame 92. As will be apparent from FIG. 6, an end bolt 154 is secured within threaded axle end aperture 156 whereby to secure wheel 39. A slot 160 defined within frame 92 between bearings 150A, 150B houses drive sprocket 164, which is secured on to notch 149 thereof between bushings 166, 168. It will be apparent that drive chain 45 mechanically engages drive sprocket 164, and since sprocket 164 is secured to drive axle 148, positive rotation of wheels 38, 39 will be insured.

Bolt 90 perpendicularly penetrates carriage frame 92 through an orifice 170. It will be apparent that a smaller orifice 172 transversely penetrates frame 92 and intersects orifice 170 to provide passage for retainer pin 178. Also, bolt 90 includes a plurality of spaced-apart orifices 174 defined at spaced apart locations along its length which are adapted to be aligned with frame orifice 172 when the bolt is secured in a desired position. The latter feature facilitates relative adjustment in clearance between track 20 and the control box 22. For example, proper placement of pin 178 through orifice 172 and an appropriate bolt orifice 174 permits control box height adjustment. As best viewed in FIG. 6, main support bolt orifice 170 is preferably positioned closer to drive slot 160 than to the follower wheel assembly 142. In this fashion most of the weight on the suspended apparatus will be born by the drive wheel assembly 140 whereby to insure reliable frictional contact between drive wheels 38, 39 and track 20.

Figure 7:
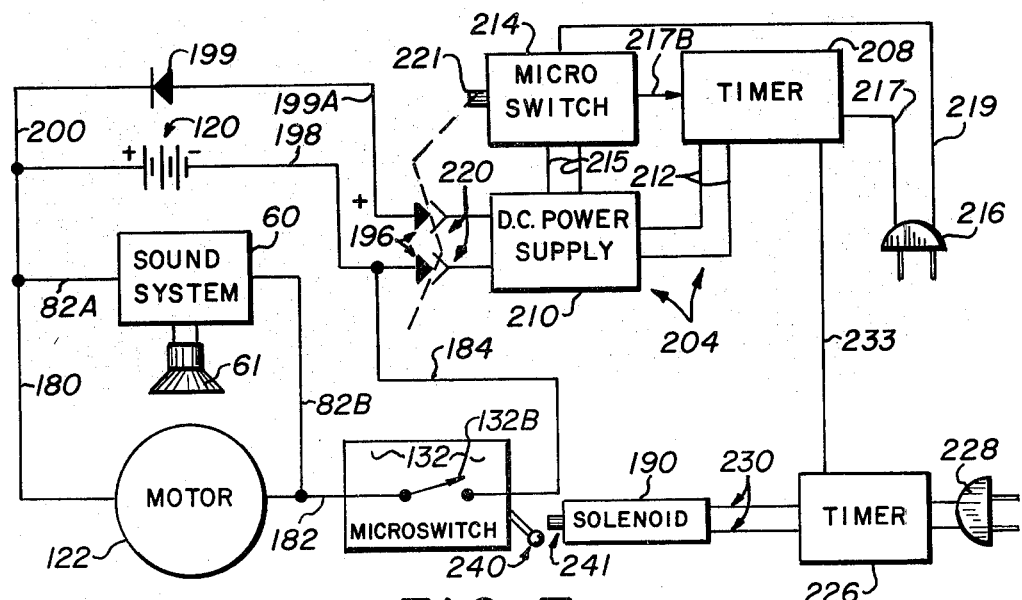

With particular reference now to FIG. 7, motor 122 is coupled via line 180 to the positive terminal of battery 120, and is coupled to switch assembly 132 via a line 182. The opposite side of switch assembly 132 is connected to the negative terminal of battery 120 via line 184. Upon closure of the switching element 132B actuation of the motor 122 will result. Micro-switch 122 must thus be closed when the unit is traveling within enclosure 12. At this time it will be apparent that the eight track tape player 60, coupled across motor 122 via lines 82A, 82B, will be similarly operational. However, when the unit moves to a predetermined battery recharge position (illustrated in FIG. 4) switch 132 will be deflected to the open position (as illustrated in FIG. 7) at which point motor 122 will be disengaged and mannequin movement will temporarily cease. A pair of recharge input terminals 196 are connected to battery 120 via lines 198, 200 and an optional isolation diode 199 to permit battery recharging. Terminals 196 are physically secured to control box roof segment 23B.

The recharge circuitry 204 comprises a first timer 208 which periodically energizes a conventional DC power supply 210 via lines 212. Timer 208 is actuated by a second switch 214, receiving nominally 120 volts A.C. power via input plug 216, and lines 217, 217B, and 219. Power supply 210 terminates in a pair of stationary recharge output terminals 220 which are adapted to frictionally and electrically make contact with recharge input terminals 196 when the apparatus mechanically moves to an appropriate recharge position illustrated in FIG. 4. A second timer 226 is also interconnected with nominally 120 volts A.C. via a plug 228 and controls solenoid assembly 190 via lines 230, as will hereinafter be described. In an optional form of this invention a line 233 extends between timer 208 and 226 to synchronize timer operation.

Timing is accomplished by appropriate interaction between timers 208 and 226. In operation, after the unit has moved throughout enclosure 12, it will return to the recharge position illustrated in FIG. 4. When the unit assumes the recharge position, microswitch 132 will be opened when solenoid apparatus 190 contacts switch follower 240. Substantially simultaneously microswitch 214 will actuate timer 208 (and hence remote power supply 210) when recharge input terminals 196 mechanically (and electrically) come into engagement with recharge output terminals 220.

Figure 5:
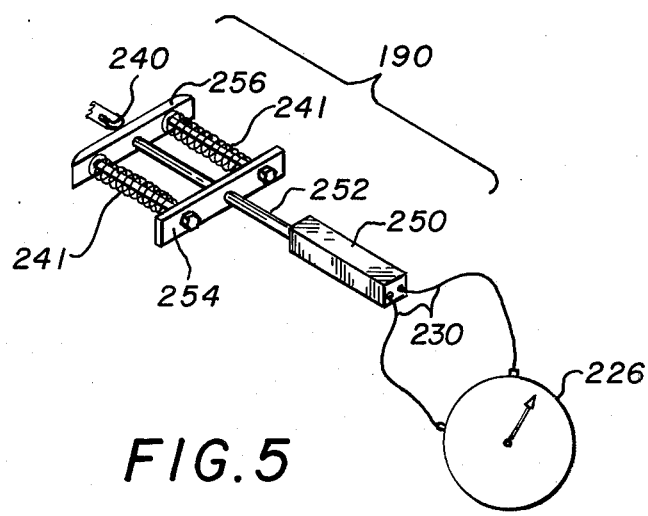
FIG. 5 is an enlarged, pictorial view of the microswitch used for controlling the apparatus and the solenoid system which contacts it.

With reference now to FIGS. 5 and 7, solenoid assembly 190 comprises a typical electromagnetic core 250 which operates a magnetically attracted plunger 252 coupled to a brace 254 and a cooperating, arcuate plate 256 which is adapted to mechanically deflect switch tripping arm 240. Thus when the control box (and mannequin 18) are traveling throughout enclosure 12 microswitch 132 (the elements 132B thereof) will be closed, since trip 240 will be normally biased toward a "switch closed" position. To initiate unit travel (by releasing arm 240) solenoid follower assembly 241 will be withdrawn by actuation of core 250, against predetermined tension from bias springs 241. After a predetermined time, timer 226 will release solenoid assembly 190, returning the cam follower 256 to an outer position wherein it may engage trip arm 240 when the unit returns to the recharge position. Timing signals generated by contact (as will later be described) between input terminals 196 and recharge output terminals 220 may be transmitted by an optional synchronizing line 233 to timer 226. A variety of conventional circuits may be employed as desired to synchronize timers 208 and 226.

The recharge timing cycle is determined by timer 208, which when actuated by microswitch 214, energizes D.C. power supply 210. Recharge output terminals 220 are mounted on opposite ends of elongated shafts 221 which extend outwardly from a mounting plate 221B and which are spring biased downwardly toward recharge input terminals 196. As best viewed in FIG. 3, the metallic recharge input terminals 196 are adapted to be slidingly contacted by tabs 220 for electrical contact. It will be noted that shafts 221 are slideably disposed with respect to microswitch 214, which is preferably mounted in spaced-apart relationship from bracket 221B on a stationary angle frame member 260A. Member 260A is rigidly secured to a brace 260B which is secured to joist 24 via a pair of screws 263. A similar cross brace 268 extends at an angle from joist 44 and is coupled to braces 260A and 260B Thus, recharging of the battery takes place when the unit moves into a recharge position and trips the appropriate switches. When switch 132 opens, the unit remains inoperative until timer 226 disengages solenoid assembly 190 from trip 240. During this time interval timer 208 provides DC power to recharge battery 120, as long as microswitch 214 is appropriately engaged. However, once timer 226 withdraws solenoid assembly 190, switch 132 will close and motor operation will initiate. Contacts 196 will be disengaged from recharge output terminals 120, allowing microswitch plunger 221 (which is spring biased toward an "off" position) to open switch 214 and thus turn off timer 208. In this fashion appropriate timing recharge cycles are generated.

OPERATION

It will be apparent that once the apparatus is substantially assembled as disclosed, as long as the unit is initially secured at an intermediate position away from the recharge station, movement will commence when battery 120 is initially connected. It will be apparent that access to internal components within the control box is provided by access door 25B. A variety of audio tapes may be prepared and inserted within the tape player 60 so that sounds appropriate for the chicks (or other animals being raised) may be generated. Visual effects of the mannequin 18 are further enhanced by the streamers 64, 64A moved by the drafts within the enclosure such as those provided by fan 74. When the unit moves to the recharge position, movement will cease as soon as microswitch 132 is opened by contact with solenoid 190. Simultaneously, microswitch 214 will be actuated, providing a recharge current for battery 120. It will be apparent that by adjustment of timers 208, 226 the operational cycles may be varied. It will also be apparent that timing cycles depend upon the length of the track and the speed of the motor (and its associated gearing). By way of example, positive results have been achieved by a complete cycle time of fifteen minutes, the unit being actuated hourly during the time period between 7:00 a.m. and 7:00 p.m., and every two hours between the time period of 7:00 p.m. and 7:00 a.m. Similar encouraging results have been achieved by running the apparatus every two hours all day. In any case when timing is appropriately adjusted so as to periodically stimulate the birds (or other animals) larger amounts of feed will be consumed. As mentioned previously, it is preferable that the unit remain "off" for substantial periodic intervals so as to allow the animals sufficient time to fully digest food already eaten.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the inventions without departing from the scope thereof, it is to be understood that all matters herein set forth or shown in the accompanying drawings is to be interpreted as illustrative and not in a limiting sense.

What is claimed is:

1. A system for stimulating the growth of animals within a feed area, said system comprising:
   mannequin means for simulating a human being;
   track means adapted to be secured at an elevated position with respect to said feed area;
   control means associated with said mannequin means for periodically moving said mannequin means amongst said animals whereby to stimulate animal feeding;
   wheeled carriage means drivingly coupled to said track and mechanically linked to said control means for propelling said mannequin throughout said feed area;
   motor means coupled to said carriage means for actuating same;
   battery power supply means associated with said control means for actuating said motor means;
   noise generation means associated with said mannequin means and powered by said power supply means for stimulating animal feeding; and,
   means for automatically recharging said battery power supply means in response to movement of said mannequin means to a preselected recharging position, said recharging means comprising:
   current input terminal means coupled to said battery power supply means and mounted externally with respect to said control means; and,
   external current source means for periodically recharging said battery power supply means, said source means coupled to are charge output terminal means adapted to contact said recharge input terminal means when said mannequin moves to said recharge position.

2. The combination as defined in claim 1 including switch means operable when in a first position to disable said motor means for battery power supply means recharging, and operable in a second position to reactivate said motor means after charging is completed.

3. The combination as defined in claim 2 including timer means for actuating said external current source means for a predetermined recharging interval.

4. The combination as defined in claim 3 including:
   solenoid means adapted to contact said switch means for switching said switch means to said first position thereby temporarily disabling said motor when said mannequin means moves to said recharge position; and,
   second timer means for actuating said solenoid means whereby to switch said switch means to said second position after completion of recharging of said battery power supply means.

5. The combination as defined in claim 1 wherein said carriage means comprises:
   an elongated rigid frame;
   a drive sprocket revolvably coupled to said frame and coupled to said motor means with a drive chain;
   a pair of drive wheels coupled to said sprocket on opposite sides of said frame for frictionally engaging said track means;
   a pair of follower wheels spaced apart from said drive wheels and secured to said frame; and,
   bolt means extending through an orifice provided in said frame and adapted to be secured to said control means whereby to suspended said mannequin means from said track.

6. The combination as defined in claim 5 wherein:
   said bolt includes a plurality of transverse mounting holes defined in spaced-apart locations along its axis;
   said frame includes a transverse locking hole adapted to be axially aligned with said bolt mounting holes; and
   said system includes pin means for securing said bolt means to said frame by penetrating both said locking hole and a desired on of said plurality of transverse mounting holes.

7. A poultry raising house comprising:
   enclosure means for housing and confining poultry to be raised;
   mannequin means for simulating a human being;
   track means adapted to be secured at an elevated position interiorly of said enclosure;
   control means for periodically moving said mannequin means within said enclosure, whereby to stimulate poultry feeding;

wheeled carriage means secured in driving engagement to said track means and mechanically linked to said control means for propelling said mannequin means throughout said poultry raising house;
motor means responsive to battery means for actuating said carriage means;
noise generation means associated with said mannequin means for stimulating animal feeding; and,
means for automatically recharging said battery means when said mannequin means moves to a preselected recharging position, said recharging means including:
recharge input terminal means electrically connected to said battery means; and
external current source means for periodically charging said battery means, said external current source means coupled to recharge output terminal means positioned to contact said recharge input terminals when said mannequin means moves to said recharge position.

8. The combination as defined in claim 7 including timer means for actuating said external current source means for a predetermined recharging interval and switch means operable when in a first position to disable said motor means for recharging and operable in a second position to reactivate said motor means after charging is completed.

9. The combination as defined in claim 8 including solenoid means adapted to contact said switch means for switching said switch means to said first position when said mannequin means moves to said recharge position.

10. The combination as defined in claim 9 including second timer means for actuating said solenoid means whereby to switch said switch means to said second position after completion of battery recharging.

11. The combination as defined in claim 10 wherein said carriage means comprises:
an elongated frame;
a drive sprocket revolvably coupled to said frame and coupled to said motor means with a drive chain;
a pair of drive wheels coupled to said sprocket on opposite sides of said frame for frictionally engaging said track means;
a pair of follower wheels spaced apart from said drive wheels and secured to said frame; and,
bolt means extending through an orifice provided in said frame and adapted to be secured to said control means whereby to suspend said mannequin means from said track.

12. The combination as defined in claim 11 wherein:
said bolt means includes a plurality of transverse mounting holes defined in spaced-apart locations along its length;
said frame includes a transverse hole adapted to be axially aligned with said bolt mounting holes; and
said system includes pin means for securing said bolt means to said frame by penetrating said transverse hole and a desired one of said plurality of transverse mounting holes.

13. A method for stimulating the growth of animals, said method comprising the steps of:
suspending a human-like mannequin from a track secured above said animals;
automatically mechanically moving said mannequin among said animals at predetermined intervals;
generating audible sounds from said mannequin; and, timing the operation of said mannequin within said enclosure by:
disabling said mannequin for timed periods corresponding to the amount of time said animals need to digest food, said disabling step occuring in response to movement of said mannequin to a predetermined position; and,
reactivating said mannequin means after completion of said timed period.

14. A system for stimulating animals, said system comprising:
mannequin means for simulating a human being;
track means adapted to be secured in spaced relation relative to said animals;
wheeled carriage means coupled to said track means and linked mechanically to said mannequin means for propelling and supporting said mannequin means;
motor means coupled to said carriage means for actuating same;
battery power supply means for actuating said motor means;
means for automatically recharging said battery power supply means when said mannequin means moves to a preselected recharging position, said recharging means comprising:
externally mounted recharge input terminal means electrically coupled to said battery power supply means; and,
a remote source of electric current for periodically recharging said battery power supply means, said source coupled to recharge output terminal means adapted to contact said recharge input terminal means when said mannequin means moves to said recharge position;
switch means operable when in a first position to disable said motor means for battery power supply means recharging and operable in a second position to reactivate said motor means after recharging is completed;
solenoid means adapted to contact said switch means for switching said switch means to said first position when said mannequin means moves to said recharge position; and,
timer means for activating said solenoid means after completion of battery recharging whereby to return said switch to said second motor reactivating position.

15. The system as defined in claim 14 wherein said mannequin means includes internal noise generation means operated by said battery operated power supply means for promoting stimulation of animals.

16. The system as defined in claim 14 wherein said carriage means comprises:
an elongated rigid frame;
a drive sprocket revolvably coupled to said frame and coupled to said motor with a drive chain;
a pair of drive wheels coupled to said sprocket on opposite sides of said frame for frictionally engaging said track;
a pair of follower wheels spaced apart from said drive wheels and secured to said frame; and,
bolt means extending through an orifice provided in said frame for suspending said mannequin means.

17. The system as defined in claim 16 wherein:
said bolt includes a plurality of transverse mounting holes defined in spaced-apart locations along its axis;

said frame includes a transverse locking hole adapted to be axially aligned with said bolt mounting holes; and, said system includes pin means for securing said bolt to said frame by penetrating both said locking hole and a desired one of said plurality of transverse mounting holes.

18. A poultry raising house comprising:

enclosure means for housing and confining poultry to be raised;

mannequin means for simulating a human being;

track means adapted to be secured at an elevated position interiorly of said enclosure;

wheeled carriage means secured in driving engagement to said track means and mechanically linked to said mannequin means for propelling said mannequin means throughout said poultry raising house;

motor means coupled to said carriage means for actuating same;

self-contained battery power supply means for actuating said motor means;

means for automatically recharging said battery means when said mannequin means moves to a preselected recharging position, said recharging means comprising:

externally mounted recharge input terminal means electrically coupled to said battery power supply means; and, a remote source of electric current for periodically recharging said battery power supply means, said source coupled to recharge output terminal means adapted to contact said recharge input terminal means when said mannequin means moves to said recharge position;

switch means operable when in a first position to disable said motor means for battery power supply means recharging and operable in a second position to reactivate said motor means after recharging is completed;

solenoid means adapted to contact said switch means for switching said switch means to said first position when said mannequin means moves to said recharge position; and, timer means for activating said solenoid means after completion of battery recharging whereby to return said switch to said second motor reactivating position.

19. The house as defined in claim 18 wherein said mannequin means includes internal noise generation means operated by said battery operated power supply means for promoting stimulation of animals.

20. The house as defined in claim 18 wherein said carriage means comprises:

an elongated rigid frame;

a drive sprocket revolvably coupled to said frame and coupled to said motor with a drive chain;

a pair of drive wheels coupled to said sprocket on opposite sides of said frame for frictionally engaging said track;

a pair of follower wheels spaced apart from said drive wheels and secured to said frame; and, bolt means extending through an orifice provided in said frame for suspending said mannequin means.

21. The house as defined in claim 20 wherein:

said bolt includes a plurality of transverse mounting holes defined in spaced-apart locations along its axis;

said frame includes a transverse locking hole adapted to be axially aligned with said bolt mounting holes; and, said system includes pin means for securing said bolt to said frame by penetrating both said locking hole and a desired one of said plurality of transverse mounting holes.

* * * * *